UNITED STATES PATENT OFFICE.

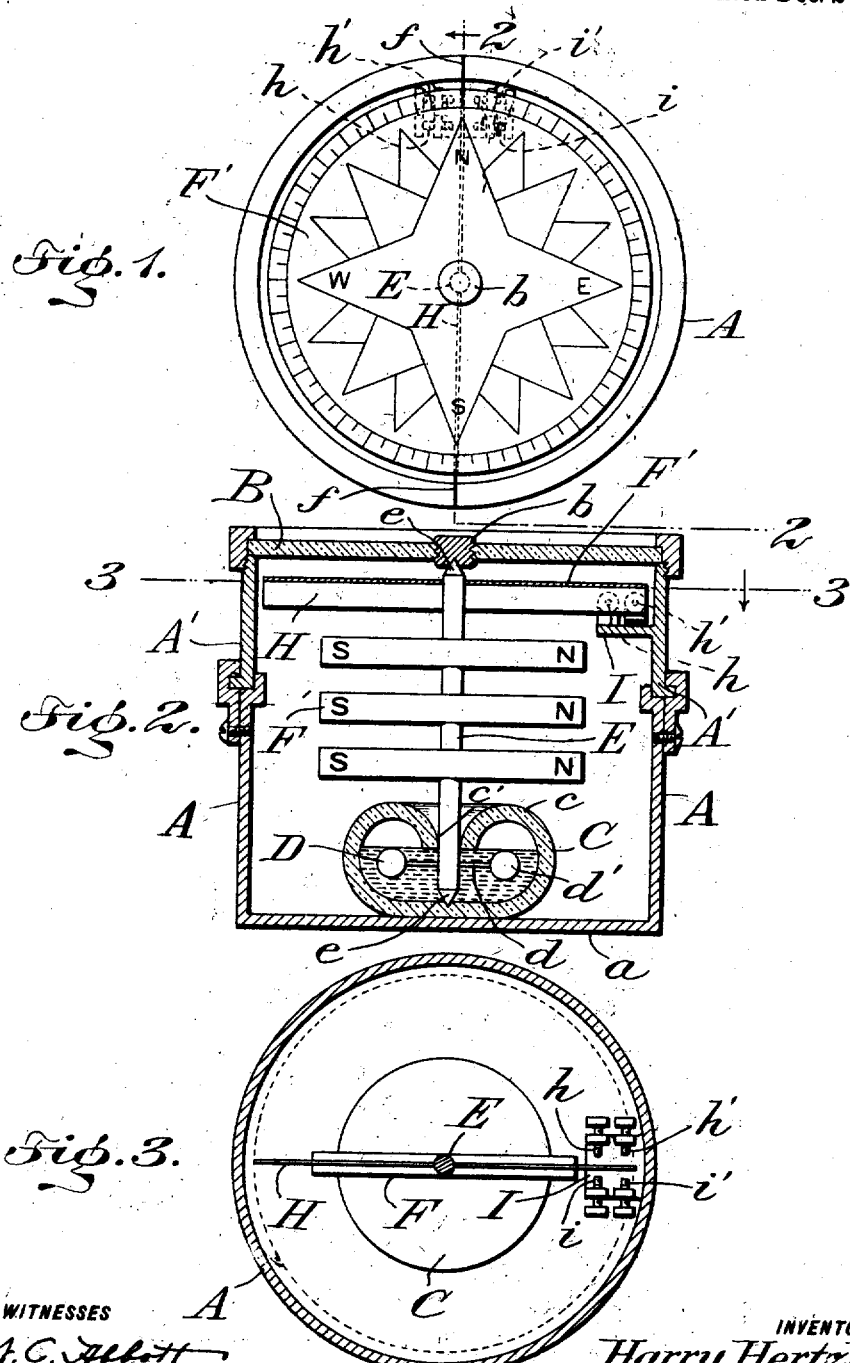

HARRY HERTZBERG, OF NEW YORK, N. Y., ASSIGNOR TO ABBOT A. LOW, OF HORSESHOE, NEW YORK; MAURICE J. WOHL, OF NEW YORK, N. Y., AND HARRY HERTZBERG, OF BROOKLYN, NEW YORK, TRUSTEES.

MARINE COMPASS.

980,155. Specification of Letters Patent. Patented Dec. 27, 1910.

Original application filed August 14, 1906, Serial No. 330,613. Divided and this application filed May 31, 1907. Serial No. 376,728.

*To all whom it may concern:*

Be it known that I, HARRY HERTZBERG, a citizen of the United States, residing in the city of New York, borough of Brooklyn, county of Kings, and State of New York, have invented a certain new and useful Marine Compass, of which the following is a specification.

The subject matter of this application is a division of a prior application filed by me on Aug. 14, 1906, Serial No. 330,613, for an invention appertaining to "steering apparatus for marine vessels, torpedoes, and the like."

The invention is a compass for use in connection with, or as a part of, a system for steering marine vessels, torpedoes, and any or all classes of marine craft.

A salient feature of the compass forming the subject matter of this application is a non-spillable cup which is contained within a box or casing. Said cup is adapted to contain a liquid in which is a float which sustains a part of the weight of a staff for the magnetic needle, whereby said staff and the needle are mounted to rotate with ease and freedom.

Another element of the compass, in a preferred form of the invention, is a circuit controller adapted to be operated by the staff, said controller being in the compass box and arranged to open and close an electric circuit or circuits, the terminals or contacts of which are contained, also, within said compass box.

The liquid is confined in the aforesaid cup against loss by the pitching or rolling of the vessel, craft, or the like. Furthermore, the liquid in the cup is some distance away from the circuit controller and the terminals or contacts of the aforesaid circuit, thus keeping the liquid away from the path of an electric spark which may be produced by making and breaking the circuit due to the engagement of the controller with, or its disengagement from, the aforesaid terminals.

In the accompanying drawings, I have illustrated one practical embodiment of the invention, but the construction shown therein is to be understood as illustrative only, and not as defining the limits of the invention.

Figure 1 is a plan view of a marine compass embodying the invention. Fig. 2 is a vertical cross section on the line 2—2 of Fig. 1. Fig. 3 is a sectional plan view on the line 3—3 of Fig. 2.

A designates a compass box or casing which may be composed of any suitable material and made in appropriate shapes and sizes. Said box or casing is substantially air and liquid tight, and as is usual in the art, the upper part of the casing is closed by a transparent top or cover, B, the latter being secured in a suitable way to and within the upper edge portion of said casing.

C designates a non-spillable cup adapted to contain a liquid substantially as indicated in Fig. 2 of the drawings. Said cup may be composed of any suitable material, such as glass, as represented in Fig. 2, and said cup may be of any appropriate size to contain a sufficient quantity of liquid adapted to sustain a float, indicated at D, which float supports the weight of a staff, E, and the devices carried by said staff. The cup, C, is secured in a suitable way to the bottom, $a$, of the box or casing, A, and said cup has its mouth portion, $c$, curved inwardly and downwardly, as shown in Fig. 2, whereby said mouth portion leaves an opening, $c'$, in the central upper portion of the cup for the passage therethrough of the lower part of the staff, E. Said staff is pointed at its ends as indicated at $e$, the lower end of the staff being stepped centrally in the bottom of the cup, C. The upper pointed end, $e$, of said staff may be mounted in the compass box or casing in a suitable way, but as shown in Figs. 1 and 2, the transparent top, B, is provided with a bearing, $b$, having in its underside a recess adapted for the reception of the upper pointed end of the staff, E. It will be seen that the staff is mounted at its ends in the cup, C, and in the cover, B, and further, that the staff extends loosely through the central opening, $c'$, of said cup, C, whereby the staff is adapted to turn freely within the compass box or casing.

The magnetic needle of the compass consists of a plurality of permanent magnets, F, and a dial, F', all of which are secured firmly to the staff in a suitable way so as to turn therewith. As shown in Fig. 2, the compass is provided with a series of permanent bar magnets, three in number, all arranged in the same vertical plane, with their north magnetic poles on one side of the staff, and with their south magnetic poles on the opposite side of said staff. The particular arrangement of the bar magnets, and the number of said magnets is not, however, a material feature of this invention, for the reason that the number may be varied as desired, and where two or more magnets are employed they may be arranged in any suitable or preferred manner. It is evident, however, that the magnets should be secured centrally on the staff, in order to balance them thereon.

The dial, F', may be composed of metal, paper, celluloid, or any other appropriate material. Said dial is secured on the staff, E, above the plurality of permanent magnets thereon, said dial being arranged, preferably, below the transparent cover, B, whereby the dial conceals the plurality of magnets and is visible through the top, B. Said dial is provided with a chart which is inscribed to designate the cardinal points of the compass, the steering points and the degrees of a circle. The dial turns with the staff, E, and it is adapted to coöperate with suitable index marks, technically known as the "lubber lines", indicated at $f$ in Fig. 1.

The float, D, is composed of suitable buoyant material, and as shown in Fig. 2, said float consists of a web, $d$, and a rim, $d'$. For the purpose of this invention the float is composed of cork, but it is evident that the rim, $d'$, only may be made of cork while the web, $d$, may be composed of other appropriate moisture proof material. The web, $d$, of the float is fastened rigidly to the staff, E, and the entire float is, preferably, submerged in the liquid of the cup, C, whereby the float is adapted to partly sustain the weight of the permanent magnets, the dial, and a circuit controller, H. The staff is thus mounted within the compass box to turn easily and freely therein.

The circuit controller, H, is shown as consisting of a metallic bar which is secured at its middle to the staff, E, preferably at a point below the dial, F', whereby said controller is concealed by the dial. Other forms of circuit controllers may, however, be employed. Said circuit controller is adapted to coöperate with the contacts, $h, h'$, and $i, i'$, said contacts being disposed within the upper part of the compass box, and supported therein by suitable means, such as the shelf or bracket, I. The contacts, $h, h'$, are employed in connection with suitable wires or conductors which form one branch of an electrically operated helm controlling circuit, whereas the other contacts, $i, i'$, are the terminals of another branch of said electric circuit. The wires or conductors (not shown) of the two branches of the electrical circuit are adapted to be led or extended through the compass box in an obvious manner in order that they may be connected with the contacts, $h, h'$, and $i, i'$. The circuit controller, H, is rotated within the compass box by the movement of the magnetic needle, and an end portion of said controller plays between the two sets of terminals, whereby said controller is adapted to close either branch of the electric circuit by engaging with the terminals thereof. When the controller, H, is shifted in one direction by the deflection of the magnetic needle, it engages with the terminals, $h, h'$, for the purpose of closing one branch of the electric circuit, but when the controller is moved in an opposite direction by the action of the magnetic needle its end makes contact with the terminals, $i, i'$, and thereby closes the other branch of said electric circuit. It is evident that the controller is normally free from engagement with the terminals of the two circuit branches so that said controller occupies a neutral position between the aforesaid terminals.

When the course of a vessel is determined upon the steering apparatus employed in connection with the compass herein described operates automatically to guide or direct the vessel in a substantially straight course, but the action of currents and the motion of waves on the craft changes the course of the vessel in one direction or the other so that the magnetic needle will dip one way or the other, whereupon the controller engages with the pair of terminals, as $h, h'$, for closing one branch of the electric circuit, whereby the steering engine is actuated to restore the vessel to its course. Similarly, the deflection of the needle in an opposite direction makes the controller engage with the other pair of contacts, $i, i'$, thereby closing the other branch of the aforesaid electric circuit for the purpose of again operating the steering engine and shifting the helm of the craft, thus again restoring the vessel on its course. A deviation of the craft from a predetermined course is comparatively slight for the reason that the compass acts automatically to at once operate the steering mechanism, thereby moving the helm and correcting the path of the vessel.

It is evident that the compass box or casing may be mounted in the manner disclosed in my prior application for the purpose of operating it by hand.

The compass is "dead beat" in its operation, that is to say, the needle is not affected by the pitching or rolling of the vessel or craft on which it is mounted. This is due to the employment of the float, D, working in the liquid of the cup, C, the frictional resistance of said cup to the motion of the float operating to overcome sudden fluctuation or motion of the needle.

Having thus fully described the invention, what I claim as new, and desire to secure by Letters Patent is:

1. A compass comprising a box, a non-spillable liquid cup positioned therein, the side wall of said cup being curved inwardly upon itself and producing a mouth, the diameter of which is less than that of said cup, a staff stepped in the cup and extending through the small diameter mouth portion thereof to a point above said cup, a magnetic needle mounted on the staff, and a float attached to the staff and adapted to be immersed in liquid to be contained in the cup.

2. A compass comprising a box having a staff bearing at its top, a non-spillable cup positioned in the box, at the lower portion thereof, a staff extending through the upper part of said cup, the lower end of said staff being mounted in the cup and the upper end thereof in the bearing of the casing, a magnetic needle on the staff exteriorly to said cup, a circuit controller carried by the staff, circuit terminals in the path of said circuit controller, and a float attached to the staff and immersed in liquid adapted to be contained in said cup for the purpose of sustaining, primarily, the weight of said needle and the circuit controller.

In testimony whereof I have signed my name to this specification in the presence of two subscribing witnesses.

HARRY HERTZBERG.

Witnesses:
R. C. R. BINDER,
JOSEPH F. GARAN.